(12) United States Patent
Shahine et al.

(10) Patent No.: US 8,799,073 B2
(45) Date of Patent: Aug. 5, 2014

(54) COMPUTING SYSTEM FOR MONETIZING CALENDAR APPLICATIONS

(75) Inventors: Omar H. Shahine, San Francisco, CA (US); Niranjan Vasu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1297 days.

(21) Appl. No.: 11/464,717

(22) Filed: Aug. 15, 2006

(65) Prior Publication Data

US 2008/0046311 A1 Feb. 21, 2008

(51) Int. Cl.
*G06Q 30/00* (2012.01)
*G05B 19/418* (2006.01)

(52) U.S. Cl.
USPC ........................................ 705/14.5; 705/14.4

(58) Field of Classification Search
USPC ........................................................... 705/14
See application file for complete search history.

(56) References Cited

U.S. PATENT DOCUMENTS

| | | | | |
|---|---|---|---|---|
| 5,855,006 | A * | 12/1998 | Huemoeller et al. | 705/9 |
| 6,978,246 | B1 | 12/2005 | Ruvolo et al. | |
| 7,039,596 | B1 | 5/2006 | Lu | |
| 2003/0147309 | A1 | 8/2003 | Weisberg | |
| 2004/0264301 | A1 | 12/2004 | Howard et al. | |
| 2005/0041667 | A1 | 2/2005 | Miller et al. | |
| 2005/0197894 | A1 * | 9/2005 | Fairbanks et al. | 705/14 |
| 2005/0215310 | A1 | 9/2005 | Boyd et al. | |
| 2005/0222971 | A1 | 10/2005 | Cary | |
| 2005/0272408 | A1 | 12/2005 | Wilkes-Gibbs et al. | |
| 2006/0041460 | A1 | 2/2006 | Aaron | |

FOREIGN PATENT DOCUMENTS

| | | |
|---|---|---|
| JP | 2001076001 A | 3/2001 |
| JP | 2001175753 | 6/2001 |
| JP | 2001319008 A | 11/2001 |
| JP | 2002041537 | 2/2002 |
| JP | 2002073926 | 3/2002 |
| JP | 2002207747 | 7/2002 |
| JP | 2003141414 | 5/2003 |
| JP | 2003150843 A | 5/2003 |
| JP | 2003330851 A | 11/2003 |
| JP | 2006018556 | 1/2006 |

OTHER PUBLICATIONS

"Microsoft is ready to help us be hip New on-line city guide has big bucks and big staff to take on existing info sites", San Francisco Examiner [San Francisco, Calif] Oct. 7, 1997: C.1.*
PC World's Tech log—"Google Does an Online Calendar", Posted by Harry McCracken, Apr. 12, 2006 http://blogs.pcworld.com/techlog/archives/001845.html.

(Continued)

*Primary Examiner* — Victoria Vanderhorst
(74) *Attorney, Agent, or Firm* — Tom Wong; Jim Ross; Micky Minhas (57) ABSTRACT

A method is disclosed for advertisers to target specific calendar users with the advertisers' events. When uploading information for an advertisement to a service provider system, the advertiser provides targeting criteria along with advertisement content. The targeting criteria is compared against user data stored about the user within one or more databases in the service provider system to select targeted recipients that meet the targeting criteria. The advertised events are then downloaded for display along side a users' calendar interface, where users may quickly and easily add the event to their calendars.

19 Claims, 8 Drawing Sheets

(56) References Cited

OTHER PUBLICATIONS

"Calendar of events", Copyright 2003 KiKUZE Solutions Pte Ltd. http://www.kikuze.com/htmlgfx/calendar/calendar.htm.
International Search Report and Written Opinion dated Feb. 4, 2008, in PCT Application No. PCT/US2007/017323.
Office Action dated Dec. 7, 2010, Chinese Application No. 200780030370.8.
Summary English Translation of Office Action dated Dec. 7, 2010, Chinese Application No. 200780030370.8.
Response to Examination Report filed Jan. 19, 2012 in Australian Application No. 2007284920.
Response to Office Action filed Apr. 19, 2011 in Chinese Application No. 200780030370.8.
Partial English Translation of Response to Office Action filed Apr. 19, 2011 in Chinese Application No. 200780030370.8.
Office Action dated May 11, 2011 in Chinese Application No. 200780030370.8.
Response to Office Action filed Jul. 25, 2011 in Chinese Application No. 200780030370.8.
Examination Report dated Oct. 6, 2011 in Australian Application No. 2007284920.
Communication dated Jun. 25, 2013 in European Patent Application No. 07836474.2.
Response to Communication filed Oct. 29, 2013 in European Patent Application No. 07836474.2.
Summons for Oral Proceedings dated Jan. 9, 2014 in European Patent Application No. 07836474.2.
Office Action mailed Dec. 15, 2011 in Japanese Patent Application No. 2009-524612.
English language Abstract of JP2002041537 published Feb. 8, 2002.
English language Abstract of JP2002207747 published Jul. 26, 2002.
English language Abstract of JP2006018556 published Jan. 19, 2006.
"Mastering PIM Soft genuinely made by Apple" Mastering iCal, Mac People, Issue No. Oct. 15, 2002, Japan, ASCII Corporation, vol. 8, No. 20, pp. 22-27.
Partial English language translation of "Mastering PIM Soft genuinely made by Apple" Mastering iCal, Mac People, Issue No. Oct. 15, 2002, Japan, ASCII Corporation, vol. 8, No. 20, pp. 22-27.
English language Abstract of JP2003141414 published May 16, 2003.
English language Abstract of JP2002073926 published Mar. 12, 2002.
Response to Office Action filed Mar. 12, 2012 in Japanese Patent Application No. 2009-524612.
English language translation of claims as amended in Response to Office Action filed Mar. 12, 2012 in Japanese Patent Application No. 2009-524612.
Office Action mailed Jul. 26, 2012 in Japanese Patent Application No. 2009-524612.
English language Abstract of JP2001175753 published Jun. 29, 2001.
Response to Office Action filed Oct. 23, 2012 in Japanese Patent Application No. 2009-524612.
English language translation of claims as amended in Response to Office Action filed Oct. 23, 2012 in Japanese Patent Application No. 2009-524612.
Final Rejection mailed Apr. 26, 2013 in Japanese Patent Application No. 2009-524612.
Response to Final Rejection filed Aug. 22, 2003 in Japanese Patent Application No. 2009-524612.
English language translation of claims as amended in Response to Final Rejection filed Aug. 22, 2013 in Japanese Patent Application No. 2009-524612.
Rejection dated Mar. 23, 2012 in Chinese Patent Application No. 200780030370.8.
Partial English language translation of Rejection dated Mar. 23, 2012 in Chinese Patent Application No. 200780030370.8.

\* cited by examiner

| Save | Invite Attendees | ☒ Cancel |

Subject: Dinner at Joe's Pizza
Location: 50 Main Street
Start: February 21 2006 8 00 PM ☐ All day event
End: February 21 2006 9 00 PM
Notes: Free Beer Every Tuesday night. Great Food! Fun for the whole family!
Category: Personal
Show Time as: Busy
Private: ☐ Do not display this appointment when I share my calendar

164

🔔 Reminder
☒ Send an email to xxx@hotmail.com   15 minutes before
☐ Send me a reminder using MSN Alerts   10 minutes before ↻ Recurrence

COMPUTING SYSTEM FOR MONETIZING CALENDAR APPLICATIONS

BACKGROUND

Software application programs commonly referred to as personal information managers, or PIMs, have become extremely popular as a tool for organizing, tracking and managing personal information. One aspect of a PIM is a calendar application program which provides a user interface including a graphical representation of a calendar (generally user configurable to display a day, week, month, etc.). Using the calendar interface, a user may record appointments, events and other information. Calendar application programs also provide automatic notifications and reminders about specific tasks and upcoming appointments and events. Calendar application programs typically communicate and exchange information with other PIM application programs, such as for example email and contact application programs, as well as other data stores.

A calendar interface provided by a calendar application program may be private or shared. Private calendars are accessible by authorized user(s) upon entry of the proper login credentials, and may store a user's personal appointments, events and other personal information. Private calendar application programs may either be stored locally on a client device, or centrally within a host server accessible via a network such as the Internet. Owners of private calendars can also set them up to be shared with others, but as used herein, these are still considered private calendars as permission of the owner is required before it may be accessed. Shared calendars may store events and other public information, and are accessible to all users without any one user having to grant permission for their use. Shared calendar application programs are typically stored centrally within a host server accessible via a network such as the Internet.

Calendar application programs have traditionally not included targeted ad placement. Current ad word and other advertising models have instead targeted content based interactive services. A good example is a web-hosted search engine, where advertisers bid on keywords, and have their advertisements displayed to a user when the user enters those keywords in a search query. In such models, advertisers typically pay the website host based on the number of times their ad is clicked. Advertisers are also purchasing keywords in other content based interactive services, such as for example in email application programs and Instant Messaging (IM) application programs. As in the search engine ad model, advertisers bid on keywords, and have their advertisements displayed to a user when those keywords are used in an email or message from the user.

By contrast, keyword ad models would work poorly with web-hosted calendar application programs, as the events that are added to calendars seldom convey information that would be valuable to advertisers in targeting consumers. Thus, while it is known to include ads on a calendar interface, these ads are not targeted, and as such, provide less value to advertisers.

SUMMARY

The present technology, roughly described, relates to a method for advertisers to target specific calendar users with the advertisers' events. The advertised events appear along side a users' calendar interface, where users may quickly and easily add the event to their calendars. The method may be implemented at least in part by an enterprise service provider system including a server such as a PIM server. In one embodiment, the server runs a suite of PIM application programs including a calendar application program. The calendar application program may include a calendar engine for carrying out the tasks of the calendar application program, and a calendar user interface display for allowing user interaction with the calendar application program.

The service provider system may further include an events database for storing event objects generated by the calendar application program for a plurality of users. When a user enters an event via the calendar interface, the calendar engine generates an event object containing data regarding the entered event, and stores the event object within the event database. Similarly, when a user accesses an event displayed on the calendar interface to view the event details, the calendar engine retrieves the event object from event database.

The service provider system may further include an advertiser server for receiving advertising content and targeting data from advertisers. A targeting engine within the advertiser server is responsible for selecting recipients of an ad based on the targeting data and user information stored in a profile store also included on the service provider system. The targeting data may be in a form allowing the engine to compare the targeting data against the user information in the profile store to identify the users that meet the targeting data criteria. The ad is then downloaded and displayed along side the calendar interface to those users identified as matches by the targeting engine.

In operation, once an ad is provided on a user's display, the user may insert the ad as an event into his or her calendar interface, whereupon it gets stored in the events database for that user. The user may thereafter view the stored advertising event and receive reminders for the event. In this way, the present system provides a valuable method for advertisers to target users with events which may be quickly and easily added to the users' calendar. This ability is potentially more valuable than traditional ad word models and may be priced by service providers accordingly. The present system provides a further benefit to service providers in that it creates an additional revenue generating advertising solution for existing advertising customers.

In a further embodiment, the present system allows advertisers to add their advertisements to shared calendars. When a shared calendar is created for a given category, the shared calendar may be populated with events from a plurality of different users and from a wide variety of event sources. Advertisers in this embodiment do not directly target specific users. Instead, advertisers target different categories of shared calendars. If there is a shared calendar for a category that relates to an advertiser's business or interests, the advertiser may choose to provide a targeted ad on that shared calendar. As a calendar for a particular category gets more and more users involved, it becomes more interesting to advertisers as they may then reach a greater number of users with their advertisement.

DETAILED DESCRIPTION

The present system is explained hereinafter with reference to FIGS. 1 through 8, which in general relate to a computer implemented system for monetizing the use of calendar application programs. In embodiments, the present system relates to a method for advertisers to target specific calendar users with the advertisers' events. The events appear along side users' calendar interface, where users may quickly and easily add the advertisement to their calendars. Such a system is potentially more valuable than the ad word advertising model used in search engines and the like. The ad word model may lead to a click and investigation of an ad. However, unless a user follows up immediately to purchase the advertised goods or services, the advertising opportunity is often lost. As time goes on, the user moves on to other things and the likelihood of the user returning to advertised goods or services falls off dramatically. However, by presenting users with an advertised event targeted specifically to them, while at the same time making it easy to add and save that event directly into their personal calendar, it is more likely that the ad will be recorded and not forgotten. Once an advertised event is included in the user's calendar, the user is reminded of the advertised event when viewing their calendars and through automatic reminders which may be set up in conventional calendar application programs. Such an advertising model is potentially more valuable than ad word models, and could be priced by service providers accordingly.

Figure 1:
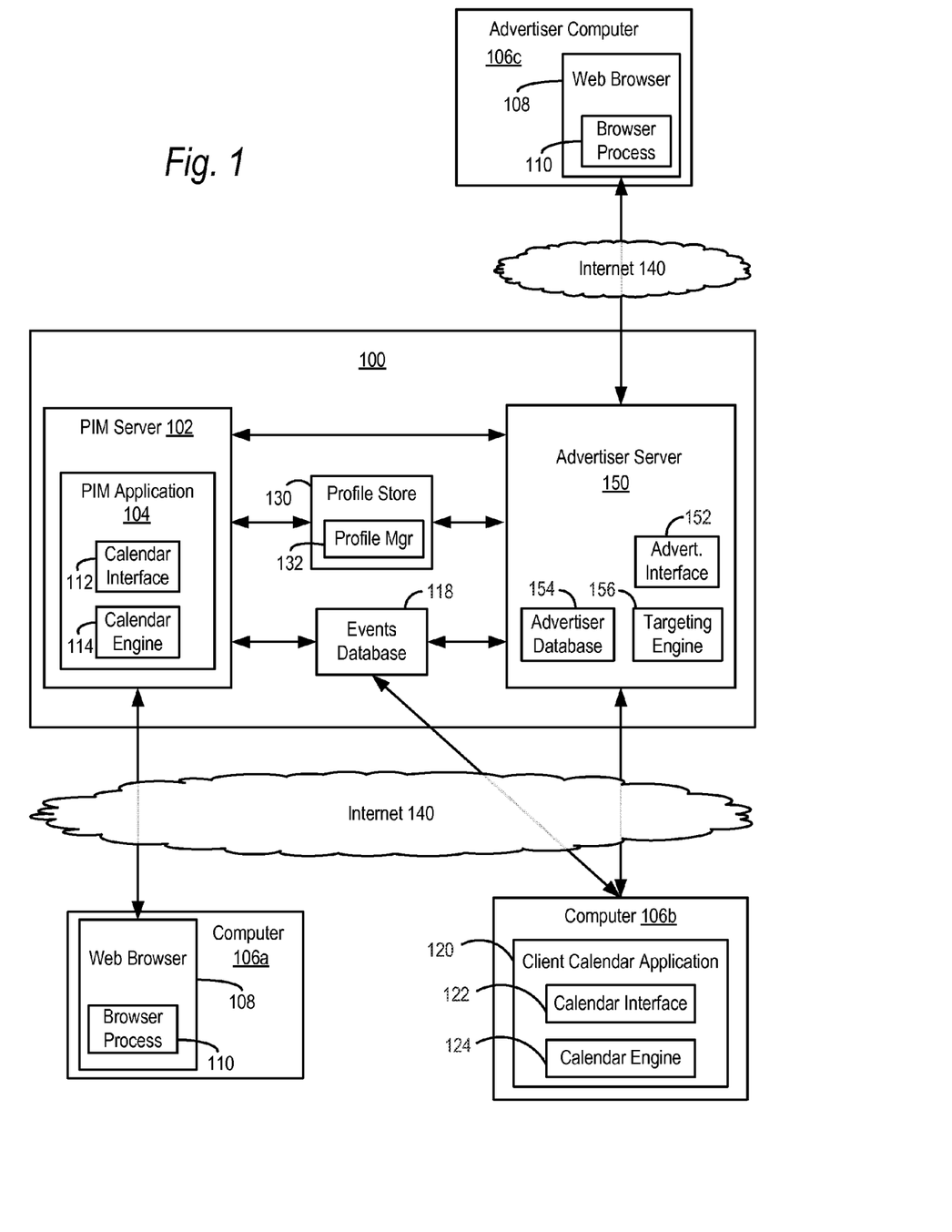
FIG. 1 illustrates a block diagram of an embodiment of a system for providing advertising in a social calendar according to the present system.

Referring initially to the block diagram of FIG. 1, there is shown an embodiment of a service provider system 100 which may be operated by an enterprise service provider such as MSN®, Yahoo®, AOL®, or other online service provider. The service provider system 100 may support different application interfaces allowing networked communication. For example, where service provider system 100 is that of the MSN® network, the system 100 may support a PIM application program such as Windows Live™ Mail, as well as an instant messaging application program such as MSN Messenger.

System 100 is comprised of a plurality of computing devices maintained by the enterprise service provider. In one embodiment, system 100 may include a PIM server 102 running a suite of PIM application programs 104 including a calendar application program. In embodiments, instead of a PIM server supporting a suite of PIM application programs, service provider system 100 may alternatively or additionally include a server dedicated solely to supporting a calendar application program. PIM server 102 may include a web server communicating with a computing device 106a via a web browser 108 on a computing device 106a. Communications between PIM server 102 and computing device 106a may take place over a network such as the Internet 140, but other networks are contemplated. The web browser 108 runs a browser process 110 on the user computing device 106a enabling computing device 106a to download and display web pages from PIM server 102, and to interact with PIM server 102.

While only computing devices 106a and 106b (described hereinafter) are shown, it is understood that any number of such devices 106a and 106b may be used to interact with system 100. In embodiments, computing devices 106a and 106b may be a variety of computing system environments including for example a desktop personal computer, a laptop, a handheld computer, a personal digital assistant (PDA), a cellular telephone, multiprocessor systems, microprocessor-based systems, programmable consumer electronics, mini-computers, distributed computing environments that include any of the above systems or devices, and the like. Further details of such computing system environments are explained hereinafter with respect to FIG. 8.

The calendar application program on PIM server 102 may include a user interface 112, presented via the web browser 108 on the display of computing device 106a, and a calendar engine 114. The user interface 112 may be presented as web pages that allow a user to interact with the calendar application program. For example, the user interface allows a user to input event information, and for the calendar application program to present stored event information to the user. An example of the user interface is explained hereinafter with respect to FIGS. 3 through 5.

The calendar engine 114 receives user input from, and presents user output to, the user interface 112. The calendar engine 114 may be a software module that performs all necessary tasks for user interaction with the computerized calendar, such as for example authenticating users, storing and retrieving event information, generating schedule conflict information, generating reminders, performing file system tasks, etc.

The service provider system 100 may further include an events database 118 for storing event objects generated by the calendar application program for a plurality of users. In particular, when a user enters an event via calendar interface 112, the calendar engine 114 generates an event object containing data regarding the entered event, and stores the event object within event database 118. Similarly, when a user accesses an event displayed on the calendar interface 112 to view the event details, the calendar engine 114 retrieves the event object from event database 118. A user's event objects stored in database 118 may be accessed and viewed only by that user and any others that have been granted viewing permission by the user.

The events database 118 may include additional information, such as for example calendar parameters configured by the user, and other data used to configure or populate a calendar interface or otherwise associated with the user. Database 118 may alternatively be resident within computing device 106a, or elsewhere outside of service provider system 100 in alternative embodiments.

The above-described embodiments of the present system operate with a web-hosted calendar application program. The calendar application program may alternatively be stored locally on a user's client device 106b. Client computing device 106b may be similar to computing device 106a, but may include a client calendar application program 120 (as part of a larger PIM application program or otherwise) capable of direct interaction with service provider system 100.

As is known, calendar application program 120 on device 106b may include a calendar interface 122 and a calendar engine 124 operating as explained above. The calendar engine 124 may transfer event objects to and from an events database, which may be stored locally on computing device 106b, within events database 118 in service provider 100, or elsewhere.

Service provider system 100 may further include a profile store 130 of user information. Upon enrolling with the enterprise service provider, a user sets up a profile of user information, via a profile manager 132. The type of user information which may be stored on profile store 130 is known, but may include for example:

Logon and authentication information;
Contact information—residence and work addresses, telephone numbers, email addresses, websites;
General—photo, name, age, occupation, interests;
Professional—business contacts, job information, resume;
Social—social contacts, relationships, interests, pets, religion, ethnicity, politics;
Dating—physical characteristics, likes, dislikes;
Gaming—Xbox® gamertag, owned games, favorites;
Education—schools, colleges, degrees.

The above information is by way of example, and profile store may include additional or alternative information about users. Profiles may be generated and edited via profile manager 132. The profile manager may include a web server which, when accessed by a user, presents the user with a web interface allowing the user to input and then save the information for their profile. The profile manager need not be a web server, and may be accessed by clients other than a web browser, in alternative embodiments. For example, the computer 106b may communicate directly with the profile store 130 in embodiments of the present system.

The service provider system 100 may further include an advertiser server 150 for receiving advertising content and targeting data from advertisers via a computing device 106c. Computing device 106c may be the same as or similar to computing devices 106a or 106b described above. Advertiser server 150 may include a web server for presenting a user interface 152 to an advertiser over a web page presented by browser 108 on a display of computing device 106c. Interface 152 allows an advertiser to upload an advertisement including textual and/or graphical data, which data is then stored in an advertiser database 154 associated with advertiser server 150. The database 154 may be stored outside of service provider system 100 in alternative embodiments of the present system.

The interface 152 may also accept targeting data from the advertiser, which targeting data is also stored within database 154. The targeting data determines which users of the calendar application program will be targeted by the advertiser. The targeting data may target users according to a wide variety of criteria. For example, the targeting data may specify that the ad be sent to users residing within a given radius of a store. The targeting data may for example specify that the ad be sent only to users in a given age group, or of a given gender, nationality, religion, etc. The targeting data may for example specify that the ad only be sent to users who have listed certain interests in their profile. The targeting data may alternatively specify that an advertisement is to be sent out to all users enrolled with the enterprise service provider. A wide variety of other criteria may be specified in the targeting data.

The advertiser server 150 may receive additional information from advertisers. Such additional information may include logon and authentication information. It may include ad run time, and price and bid information for the fee paid by the advertiser to the service provider, as explained in greater detail hereinafter. The advertiser server 150 may also send information to advertisers. For example, demographic information may be gathered by the advertising server and sent to an advertiser relating to the success of their advertisement and how that success may be improved. The transfer of other information is contemplated.

The advertiser server 150 may further include a targeting engine 156. Engine 156 is responsible for receiving the stored target data for a given stored advertisement, and then selecting the recipients to receive the ad from the profile store 130. The targeting data may be received via the advertising interface 152 in a form allowing the engine to compare the targeting data against fields within users' profiles to identify the users having stored characteristics that correlate to one or more of the targeting data criteria. For example, the targeting engine may use profile address information to generate recipients within a given radius of an advertiser, the targeting engine may use profile data relating to age to generate recipients of an age group-targeted advertisement, etc. Thus, different users may be targeted for different ads. The targeting engine 156 may be included as part of PIM server 102 in alternative embodiments of the present system. It is also contemplated that the targeting engine search other databases conventionally maintained on service provider system 100 which may have additional user information. Such additional databases may include a billing database used to bill users for subscriber servers and a contacts database of the user's contacts.

Figure 4:
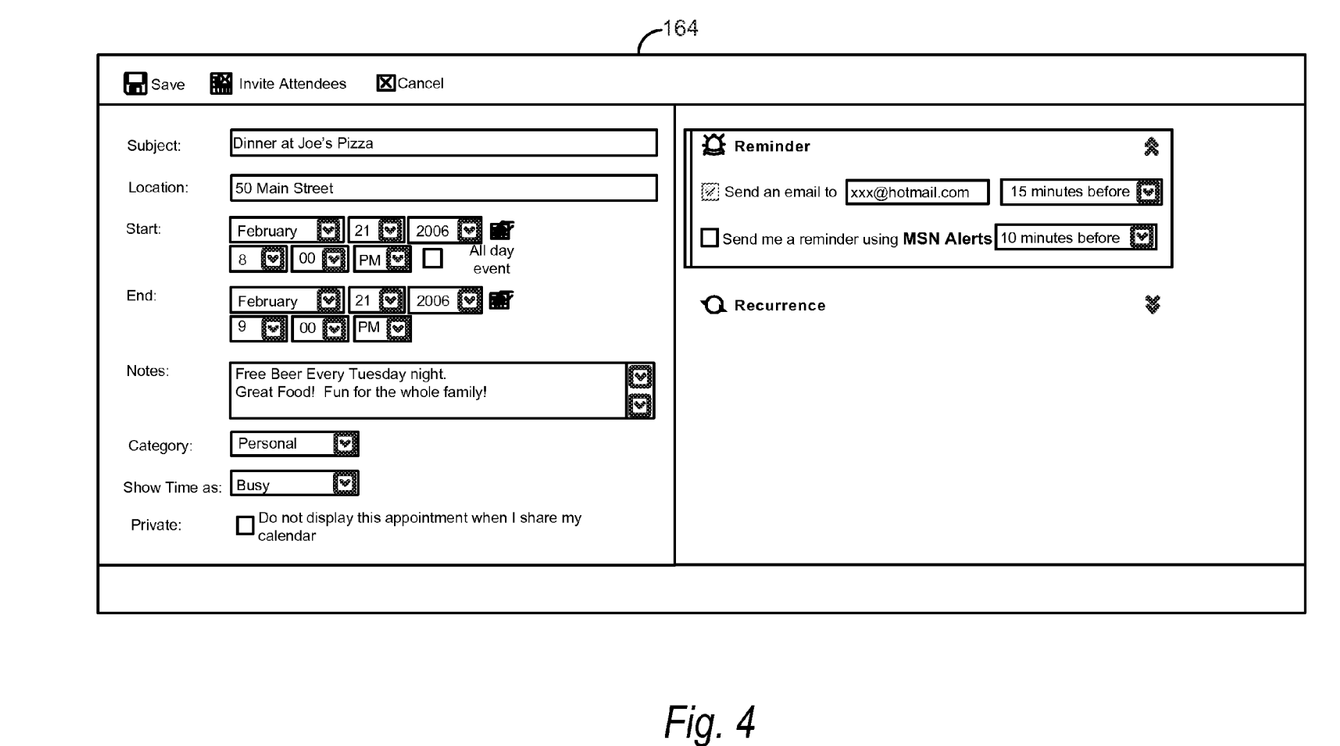
FIG. 4 is an illustration of a further calendar interface according to an embodiment of the present system.
Figure 5:
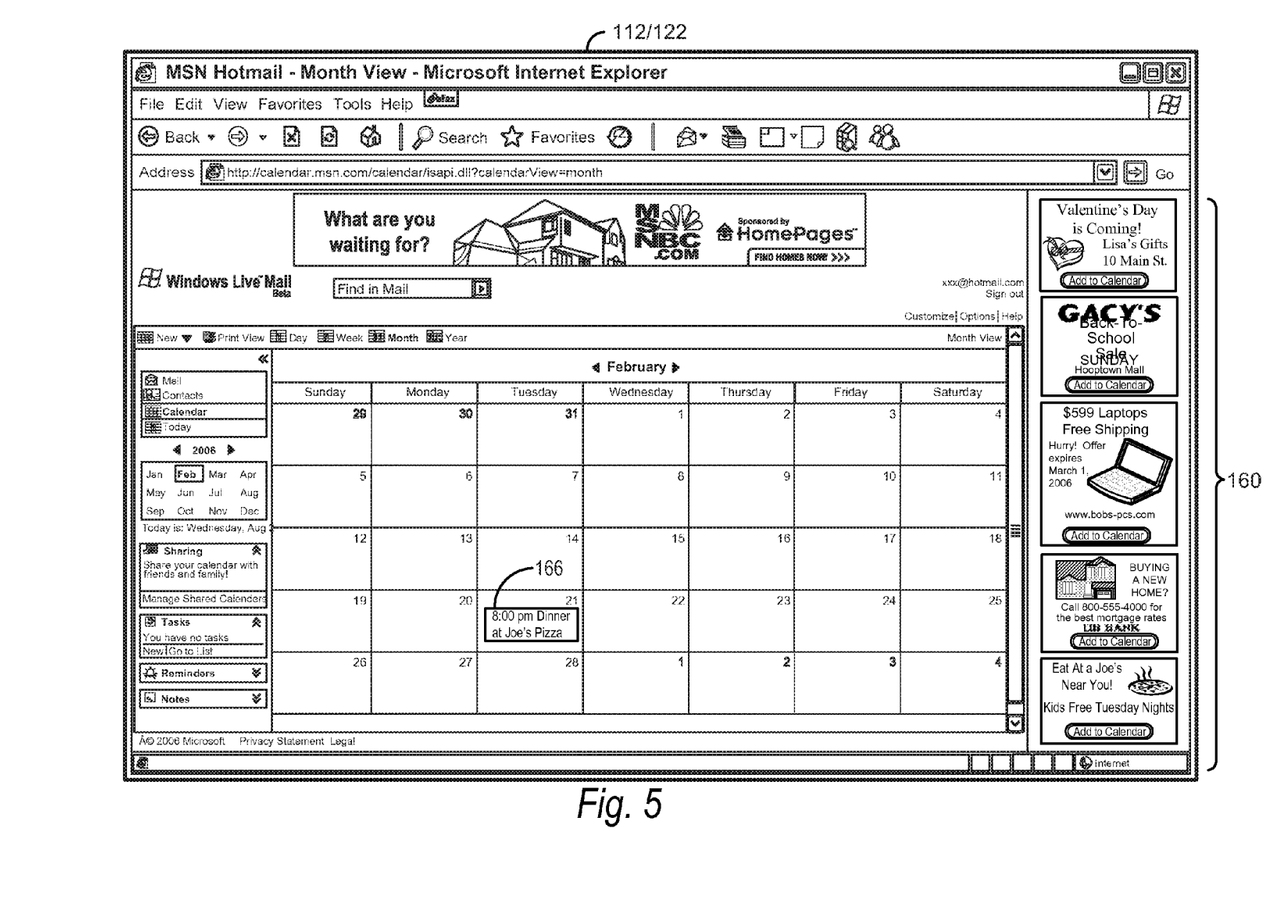
FIG. 5 is an illustration of a calendar interface including an ad added to the calendar interface according to an embodiment of the present system.

The operation of an embodiment of the present system described above will now be explained with reference to the flowchart of FIG. 2 and the illustrations of a user interface 112/122 shown in FIGS. 3 through 5. The ad content data and target data may be received from the advertiser in step 200, and stored in step 202. Targeting engine 156 may then select the recipients of the advertisement in step 204. A list of intended recipients selected in step 204 may be stored, and upon an intended recipient next opening his or her calendar interface, the advertisement may then be forwarded to the intended recipient in step 206. The advertisement may be sent using the web server in PIM server 102 to send to computing device 106a and/or directly from the advertiser server 150 to the client application program in computing device 106b.

Figure 3:
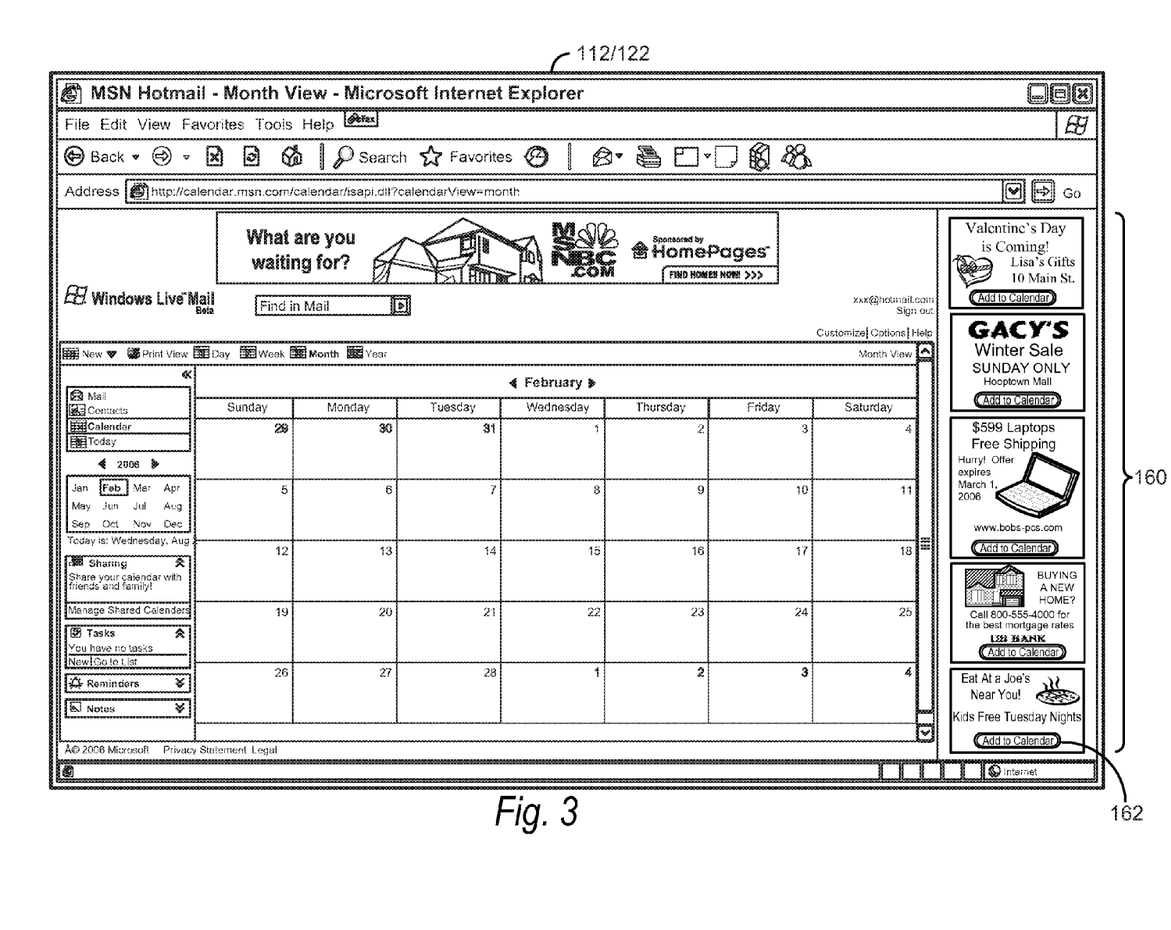
FIG. 3 is an illustration of a calendar interface including targeted ads according to an embodiment of the present system.

FIG. 3 is an illustration including a calendar user interface 112/122 which may be presented to a user over a display. The interface 112/122 may include known elements for setting user preferences and navigating to different dates. As shown, a plurality of targeted advertisements 160 may frame the user interface on one or more sides. As indicated above, the ads displayed with the interface 112/122 may have been selected by the targeting engine 156 for that user based on a variety of targeting criteria. The ads may also specify temporal events that apply to specific upcoming dates. For example, the ads may be targeted to some or all users for a specific upcoming holiday, such as the first ad directed to Valentines Day. The ads may also be targeted to some or all users to identify a particular upcoming event, such as a sale as shown in the second, third and last ads. A wide variety of other events may be advertised in addition to or instead those shown, such as for example concerts, conferences, festivals, ceremonies, sporting events, openings, parties, trips, etc. Additionally, while the targeted ads may have a specific date associated with them as described above, the targeted ad need not have a date. For example, the fourth ad shown on FIG. 3 is a targeted ad without any date for a specific event.

The order of the ads may be determined by advertiser server 150 or the PIM server 102 based on a variety of criteria. Such criteria may include how much was paid for the ad, how long the ad has been running, etc. In a further embodiment, the targeting engine may additionally assign a relevance weighting of a given ad to a given user. That is, if the targeting engine determines that a targeted ad has a high degree of relevance to a particular user, then the targeting engine may assign that ad a high weighting for that user. The higher weighted ads may then be displayed above the lower weighted ads for a given user. In such an embodiment, even where two users receive the same group of ads, a given ad may appear in different locations for the two users.

The ads are shown vertically in the chrome to the side of the calendar user interface 112/122. It is understood that the ads may be textual and/or graphical, and may frame the user interface 112/122 elsewhere in alternative embodiments. Moreover, it is understood that the number of ads may vary in alternative embodiments. A scroll bar may optionally be included to provide more ads than will fit on the user's display or within the space allotted for ads.

Each of the ads shown may include a graphical button 162, which, when selected, allows the user to add the associated advertised event to his or her calendar. If no ad is selected in step 210, then the present system performs no further steps, though the advertiser may still be invoiced in step 220 as explained below. If, on the other hand, an ad is selected in step 210, then the ad is retrieved in step 212 from the advertiser database 154. In particular, upon clicking on graphical button 162, the computing device 106a, 106b may send an identification for that ad to the advertiser server 150, and generate a request on the advertiser server for the ad. The advertiser server 150 may then look up the ad within the advertising database 154, and may then add the advertisement to the events database 118 for that user.

The user may then be presented with an interface allowing the user to add additional details regarding the event in step 214. Such an interface is shown in FIG. 4. For example, assuming a user selected the last ad shown, "Eat at a Joe's Near You," then the user could be presented with the interface 164 of FIG. 4. The interface may be a known interface for scheduling calendar events, but the advertising data uploaded by the advertiser may specify text for automatically populating some of the fields. For example, the Subject, Location and Notes fields may be automatically populated with text or other data specified by the advertiser as shown in FIG. 4. The user can change the pre-populated fields and/or specify other fields such as date, time, reminders, etc. In step 216, any changes may be saved to the event database 118, and the ad may be displayed as an event 166 on the calendar interface 112/122, for example as shown in FIG. 5.

In embodiments, ads may be for a specific date and time (concerts, sporting events, etc.). In such instances, where a user selects the Add to Calendar button 162 for those events, the step 212 of specifying event details may be skipped and the ad may be added directly to the calendar interface 112/122 in step 214 at the designated date and time. In further embodiments, instead of including the Add to Calendar button 162, the ads may be configured as graphical objects which can be dragged and dropped directly onto a specific date shown on the calendar interface 112/122. An ad may also include a link which, when accessed, adds an advertisement directly to the calendar interface 112/122. Once an ad is displayed and saved, clicking on the displayed event 166 brings up interface 164 shown in FIG. 4, allowing the user to view details and/or make changes.

As indicated, a saved event 166 may be set up to include one or more reminders. If a reminder is set, the user may receive a reminder of the event 166 in step 218. When a reminder is set, the calendar engine 114/124 may pull the event object for an event from events database 118 at the appointed time, and download them for display to the user, either on the calendar interface 112/122 or elsewhere.

An advertiser may be invoiced by the service provider in step 220. As indicated above, the ability for advertisers to place targeted ads on a calendar interface where a user may easily save them may be more valuable than ad word based models. An advertiser may be charged for presentation of an ad to a user, a click on a presented ad and/or the addition of an ad to a user's calendar interface. In a further embodiment, an advertiser may be charged for a transaction arising between the advertiser and a user after an ad is added to the user's calendar interface, for example when the concert ticket is purchased, or when a coupon code is redeemed. This could be tracked using a web address that the user would click when they want to purchase a ticket or buy something online (or print a coupon to take to the store with them) etc. Purchase details may be provided in an email reminder that may be send to a user who has made a purchase.

Figure 2:
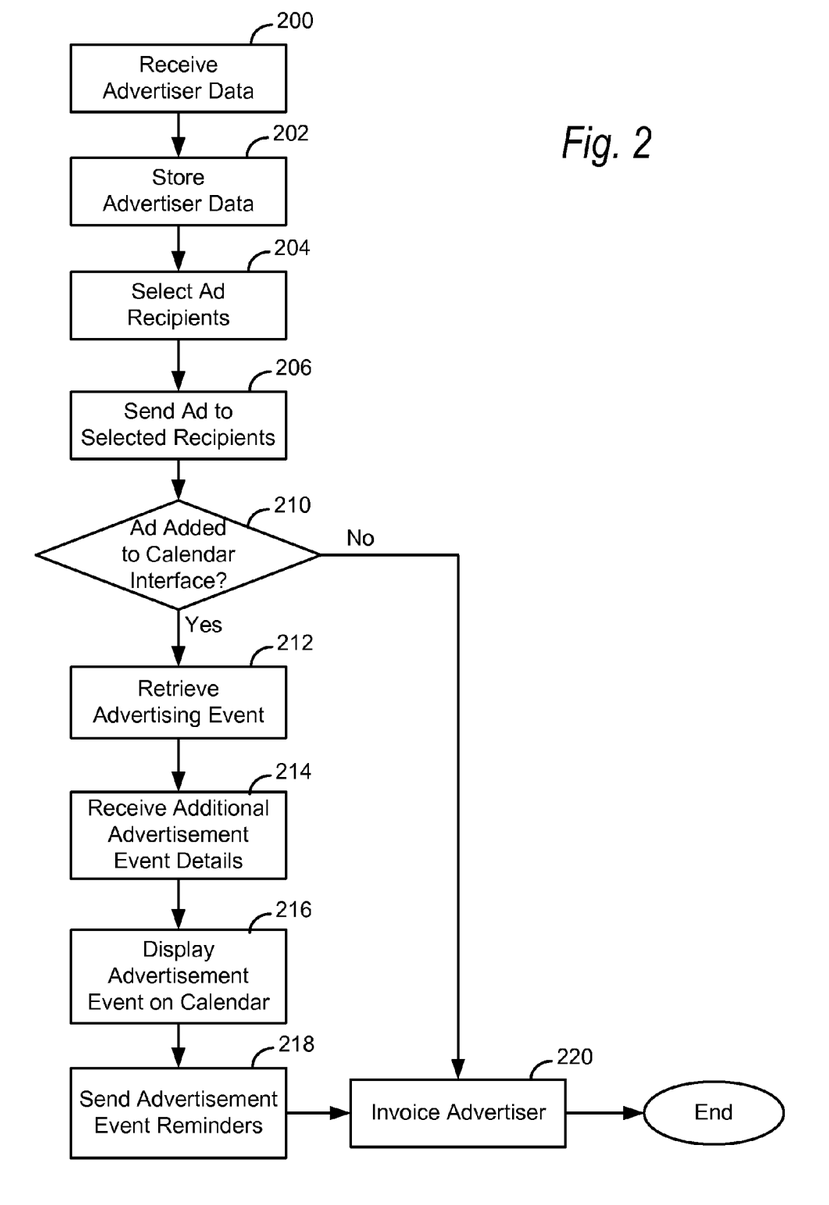
FIG. 2 is a flowchart showing the operation of an embodiment of the present system shown in FIG. 1.

Although not shown in the flowchart of FIG. 2, the present system may additionally provide demographic feedback to advertisers. For example, the advertiser server 150 may communicate with the events database 118 to determine how often and by whom their ad was added to the events database. This demographic information may be useful to advertisers in setting future ad campaigns. Demographic information may also be fed back to the advertiser server 150 and targeting engine 156 to improve the ability of the targeting engine to target the correct user groups.

In an alternative embodiment, steps 210 through 218 described above may be omitted. In such an embodiment, once the ads are displayed on the calendar interface, no further steps are performed, beyond possibly the invoicing step 220. The ad may simply be displayed (without offering the ability to add the advertisement to the calendar). In this and the above-described embodiments, the ad may also include a link to additional information relating to the advertised event, goods or services.

The above-described embodiment provides a valuable method for advertisers to target users with events which may be easily and quickly added to the users' stored calendar. This ability is potentially more valuable than traditional ad word models and may be priced by service providers accordingly. The present system provides a further benefit to service providers in that it creates an additional revenue generating advertising solution for existing advertising customers of the service provider.

In the system described above, ads are sent to targeted users as downloaded objects appearing around the calendar user interface. In an alternative embodiment of the present system, ads may additionally or alternatively be sent to targeted users as event invitations via an email. Such an email may be sent via a known email application program also included as part of service provider system 100 (possibly part of PIM server 102). As is known in the art, an email may be set up and sent including an invitation to attend an event at a given time. Such an invitation may for example include event data in the known iCalendar data exchange format. When a user receives such an email, a user may accept the invitation, at which time the event would be added to the user's calendar interface 112/122 as described above.

It may happen that an advertiser's event time or date changes after it has been scheduled. In order to handle such situations, the advertiser server 150 could periodically check the advertiser website or other designated location for changes, and if one is found, the server could update the events database 118 and notify the users. Alternatively, a central list of all users that saved a scheduled event may be maintained, and if an advertiser changes the scheduled event, the advertiser can notify the advertiser server 150, which would then access the list of those who have scheduled the event and then make the necessary change for those users. Other possibilities for correcting scheduled events are contemplated.

The embodiments described above with respect to FIGS. 1 through 5 relates to a targeted ad model for adding advertiser events to users' private calendars. An alternative embodiment described below with respect to FIGS. 6 through 7 relates to a system for adding advertiser events to users' shared calendars. It is understood that private calendars may be shared by a user through the user setting the appropriate sharing permissions. However, the concept of shared calendars as used below refers to calendars which are accessible by multiple users, and to which multiple users may add events, without any one user having to grant permissions to others for its use. In embodiments, the notion of a shared calendar as used herein may also refer to a calendar which may be set up for a single, shared event. For example, a shared calendar may be set up for users to provide and receive information relating to a concert, a conference, a festival, a ceremony, a sporting event, etc.

Referring to FIG. 6, there is again shown a block diagram of an embodiment of a service provider system 100 which may be operated by an enterprise service provider. The system 100 includes a plurality of computing devices 106a, 106b which may access the system 100 via a network 140 such as the Internet. Components having like numbers to those in FIG. 1 may operate as described above with respect to FIG. 1.

Figure 6:
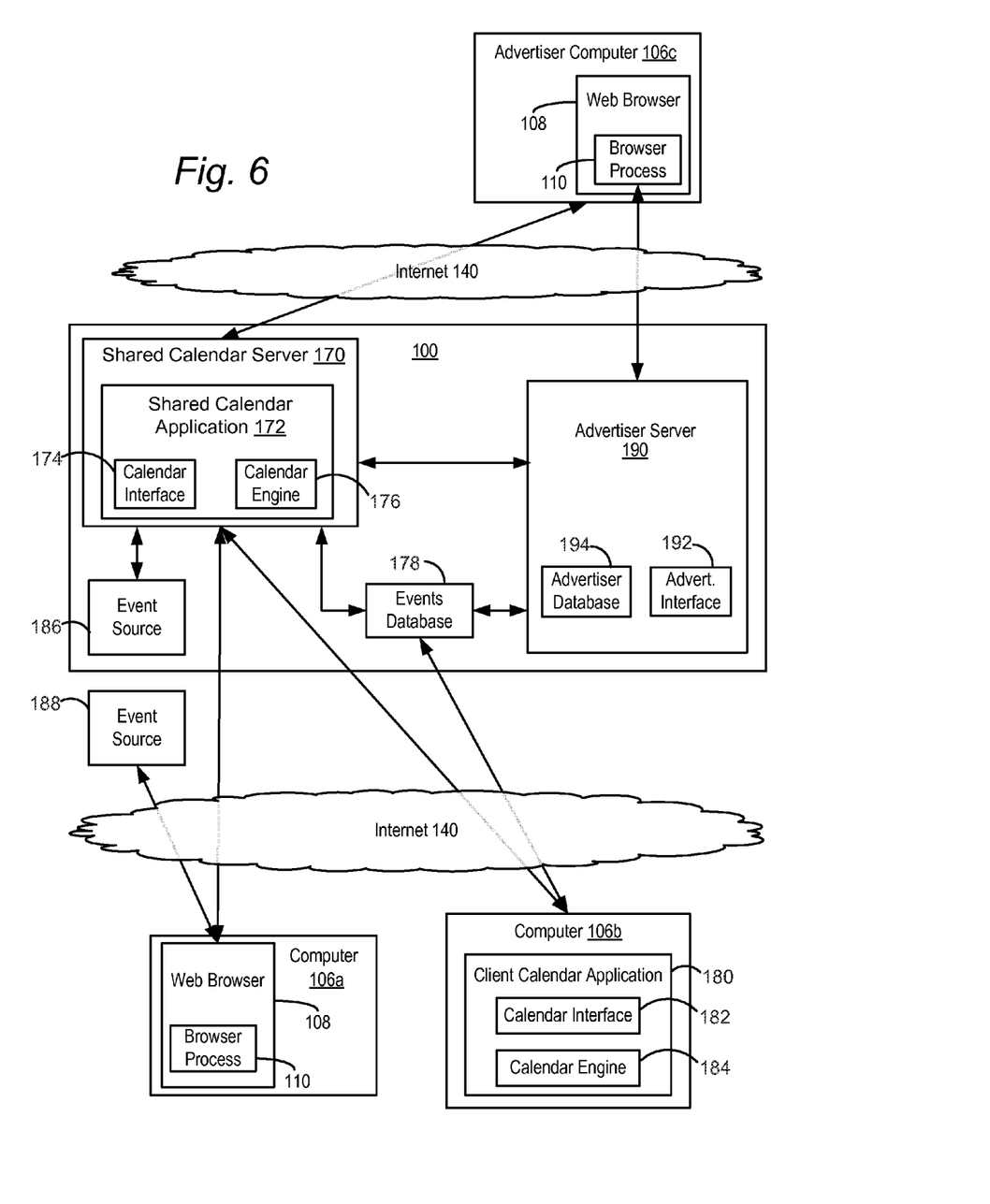
FIG. 6 illustrates a block diagram of an alternative embodiment of a system for providing advertising in a social calendar according to the present system.

In FIG. 6, the service provider 100 includes a shared calendar server 170 including a shared calendar application 172. Shared calendar application 172 may maintain a plurality of shared calendars subdivided into different categories. The categories could be any subject of interest to one or more users. As a few examples, one calendar may be devoted to when and where a local band is scheduled to play; another calendar may be devoted to when and where weddings are taking place in a given city or area; another category may be for scheduling events for a given school, business or other organization. It will be appreciated that there may be as many categories of shared calendars as there are different interests among users. An existing service capable of supporting shared calendar application 172 is MSN® Spaces or the like.

The shared calendar application program 172 may include a user interface 174, presented via the web browser 108 on the display of computing device 106a, and a calendar engine 176. The user interface 174 may be presented as web pages that allow a user to interact with the calendar application program. The calendar engine 176 may be a software module that receives user input from and presents user output to the user interface 174. The calendar engine 176 may perform other tasks for user interaction with the computerized calendar, such as for example authenticating users, storing and retrieving event information, generating reminders, performing file system tasks, and the like.

The service provider system 100 may further include an events database 178 for storing event objects generated by the shared calendar application program for a plurality of users. Events database may be similar to events database 118 of FIG. 1, with the exception that, in embodiments, the event calendar 118 includes event objects for a plurality of private calendars, where events database 178 include event objects for a plurality of shared calendars. It is possible that the databases 118 and 178 may be combined into a single database in embodiments of the present system.

The embodiment of FIG. 6 may operate in a web-based system utilizing browser 108 on computing device 106a, or in a client model, where a shared calendar application program 180 may be stored locally on a user's client computing device 106b. The shared calendar client application program may include a calendar interface 182 and a calendar engine 184 operating as explained above. In the client model, the events database may be stored locally on the user's device, but a copy may be kept on the shared calendar server 170. Synchronization techniques may be employed to make sure that a shared calendar stored on two or more local computing devices remain in sync with one anther.

In the embodiment of FIG. 6, a shared calendar may be populated with events from a plurality of users. The events may be added to the shared calendar application from a wide variety of sources. Events may be those from an individual user's schedule. Events may also be the events given by other, which may be obtained by a user from event sources 186 and/or 188 accessible to users via a network such as the Internet. Source 186 is a source of events within service provider system 100, and may comprise a webpage from a web server including current events, event information, sports schedules, and a wide variety of other content which a user may want to add to a shared calendar. Source 186 may also be a search engine hosted by the service provider system 100. Source 188 may be a source of events outside of service provider 100 capable of providing any content that a user may want to add to a shared calendar.

The service provider system 100 may further include an advertiser server 190 for receiving advertising content from advertisers via a computing device 106c as described above. Advertiser server 190 may include a web server for presenting a user interface 192, as described above, to an advertiser over a web page generated on a display of computing device 106c. Advertiser server 190 further includes a database 194 for storing advertiser data. Database 194 may be stored outside of service provider system 100 in alternative embodiments of the present system.

In the embodiment of FIG. 6, advertisers do not directly target specific users. Instead, advertisers target different categories of shared calendars. If there is a shared calendar for a category that relates to an advertiser's business or interests, the advertiser may choose to provide a targeted ad on that shared calendar. As a calendar for a particular category gets more and more users involved, it becomes more interesting to advertisers as they may then reach a greater number of users with their advertisement.

Figure 7:
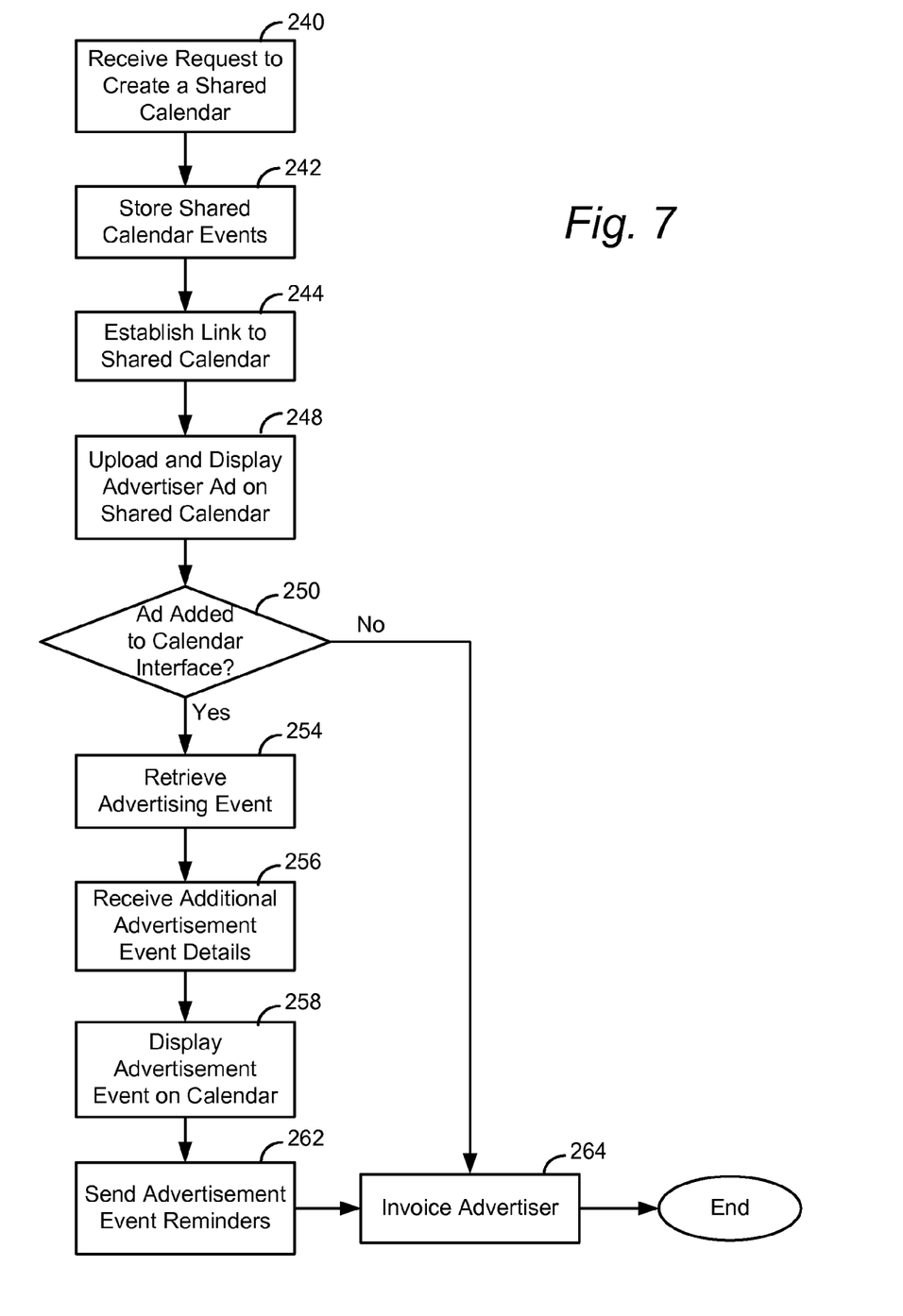
FIG. 7 is a flowchart showing the operation of an embodiment of the present system shown in FIG. 6.

The operation of the embodiment shown in FIG. 6 is now explained with reference to the flowchart of FIG. 7. In step 240, a request may be received within the shared calendar server 170 to set up a shared calendar. The request may be received either from a computing device 106a via a web browser or directly from a client computing device 106b. A shared calendar may then be set up and saved on shared calendar server 170. The shared calendar may alternatively be saved elsewhere within service provider system 100, for example in events database 178. The user may then store events on the created shared calendar in step 242. The events created may be saved on events database 178. In step 244, a link is established to the created calendar so that others may access and interact with the calendar interface for the shared calendar, possibly adding their own events to the shared calendar.

In step 248, an advertiser may upload an advertisement and have that advertisement displayed along side a shared calendar interface. Using advertiser interface 192, the advertiser may provide the content of the ad, along with an identification (storage location) of which shared calendar the advertiser wants to display its ad in. This information may be stored within advertiser database 194. In an embodiment, once the ad is displayed on the shared calendar interface, no further steps are performed beyond the invoicing step 264 explained hereinafter. The ad may simply be displayed (without offering the ability to add the advertisement to the shared calendar). In this embodiment, the ad may also include a link to additional information relating to the advertised event, goods or services.

In an alternative embodiment, once the ad is displayed, a user may have the option of adding the ad onto the calendar interface, as in the embodiment described above with respect to FIGS. 1 through 5. In particular, the ad may include a graphical button as shown on FIG. 3, which, when selected by a user, may add the advertisement to the calendar interface. If an ad is selected for addition to a calendar interface in step 250, then the ad is retrieved in step 254 from the advertiser database 194. The advertiser server 190 may look up the ad from the advertising database 194, and may add the advertisement to the events database 178.

In step 256, the user may then be presented with a user interface as explained above with respect to FIG. 4 allowing the user to add additional details regarding the event. The ad may be saved and displayed on the calendar interface in step 258. A saved event may also be set up to include one or more reminders as indicated above. If a reminder is set, the user may receive a reminder of the event in step 262. When a reminder is to be sent, the calendar engine 176/184 may pull the event object from the events database 178 at the appointed time, and download the for display to the user, either on the calendar interface or elsewhere.

An advertiser may be invoiced by the service provider in step 264. Where the ad is merely displayed on the calendar interface, the advertiser may be charged a first fee for the display, and an additional fee if the ad is clicked (to bring the user to the advertiser's site or provide additional information about the ad). On the other hand, where a user is given the ability to actually add the event to the shared calendar, the advertiser may be charged for presentation of an ad to a user, a click on a presented ad and/or the addition of an ad to a user's calendar interface. In a further embodiment, an advertiser may be charged for a transaction arising between the advertiser and a user after an ad is added to the user's calendar interface, for example when the concert ticket is purchased, or when a coupon code is redeemed. This could be tracked using a web address that the user would click when they want to purchase a ticket or buy something online (or print a coupon to take to the store with them) etc. Purchase details may be provided in an email reminder that may be send to a user who has made a purchase.

It is further understood that instead of, or in addition to, an advertiser placing an ad on a shared calendar, the advertiser may post its event directly onto a shared calendar interface, as would any other user. In embodiments, the advertiser may or may not be billed for adding its event to the shared calendar interface in this manner.

Figure 8:
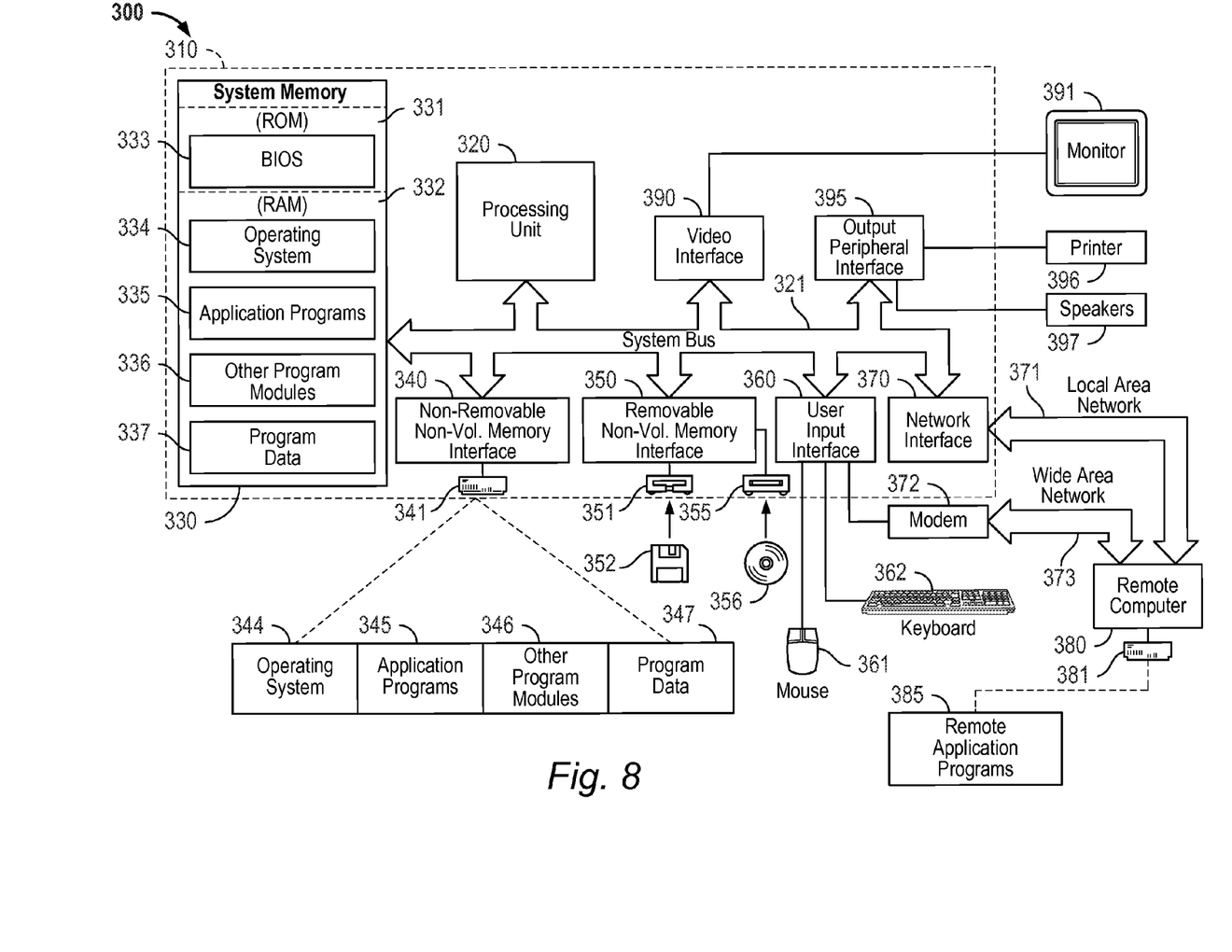
FIG. 8 illustrates a block diagram of an embodiment of a computing environment for implementing the present technology.

FIG. 8 illustrates an example of a suitable general computing system environment 300 that may comprise any of the servers or computing devices on which portions of the inventive system may be implemented. The computing system environment 300 is only one example of a suitable computing environment and is not intended to suggest any limitation as to the scope of use or functionality of the inventive system. Neither should the computing system environment 300 be interpreted as having any dependency or requirement relating to any one or combination of components illustrated in the exemplary computing system environment 300.

The inventive system is operational with numerous other general purpose or special purpose computing systems, environments or configurations. Examples of well known computing systems, environments and/or configurations that may be suitable for use with the inventive system include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

With reference to FIG. 8, an exemplary system for implementing the inventive system includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 may include a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 330 includes computer storage media in the form of volatile and/or nonvolatile memory such as ROM 331 and RAM 332. A basic input/output system (BIOS) 333, containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 8 illustrates operating system 334, application programs 335, other program modules 336, and program data 337.

The computer 310 may also include other removable/non-removable, volatile/nonvolatile computer storage media. By way of example only, FIG. 8 illustrates a hard disc drive 341 that reads from or writes to non-removable, nonvolatile magnetic media and a magnetic disc drive 351 that reads from or writes to a removable, nonvolatile magnetic disc 352. Computer 310 may further include an optical media reading device 355 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 341 is typically connected to the system bus 321 through a non-removable memory interface such as interface 340, magnetic disc drive 351 and optical media reading device 355 are typically connected to the system bus 321 by a removable memory interface, such as interface 350.

The drives and their associated computer storage media discussed above and illustrated in FIG. 8, provide storage of computer readable instructions, data structures, program modules and other data for the computer 310. In FIG. 8, for example, hard disc drive 341 is illustrated as storing operating system 344, application programs 345, other program modules 346, and program data 347. These components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and a pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 8. The logical connections depicted in FIG. 8 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communication over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 8 illustrates remote application programs 385 as residing on memory device 381. It will be appreciated that the network connections shown are exemplary and other means of establishing a communication link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A method of targeted advertising in association with the use of a calendar application program of a user, comprising the steps of:
   (a) providing a calendar user interface on a display device, the calendar user interface having a first and a second display area;
   (b) outputting a portion of a user's calendar in the first display area of the calendar user interface;
   (c) obtaining a plurality of advertisements having a correlation between targeting criteria and the user's profile information, wherein each of the plurality of advertisements corresponds to a event that may be placed in a calendar; and
   (d) displaying the plurality of advertisements in the second display area of the calendar user interface, wherein each of the plurality of advertisements displayed in the second display area of the calendar user interface includes an actionable control for adding the corresponding event to the user's calendar.

2. The method recited in claim 1, said step (c) of obtaining a plurality of advertisements having a correlation between targeting criteria and the user's profile information comprising the step of obtaining an advertisement based on the user having stored address information indicating the user has an address within a defined geographical area or defined geographical distance from an advertiser place of business.

3. The method recited in claim 1, said step (c) of obtaining a plurality of advertisements having a correlation between targeting criteria and the user's profile information comprising the step of obtaining an advertisement based on the user having stored information indicating the user is at least one of: i) a gender indicated in the targeting criteria, ii) within an age group indicated in the targeting criteria, iii) a religion indicated in the targeting criteria, iv) a nationality indicated in the targeting criteria, and v) an interest or preference indicated in the targeting criteria.

4. The method of claim 1, further comprising the step (f) of receiving an indication through selection of the actionable control to add an event corresponding to an advertisement obtained in said step (c) to the first display area.

5. The method of claim 4, further comprising the step of adding an event corresponding to an advertisement to the first display area upon receiving the indication to add the event in said step (f).

6. The method recited in claim 5, further comprising the step of automatically modifying the event added to the first display area by automatically and periodically contacting a computing device supported by the advertiser to determine if information associated with the event has changed.

7. The method recited in claim 5, further comprising the step of automatically modifying the event added to the first display area by automatically receiving notification and new information relating to a change in the event from a computing device supported by an advertiser.

8. A computer-readable storage medium having computer-executable instructions for programming a processor to perform a method of targeted advertising in association with the use of a calendar application program by a plurality of users, comprising the steps of:
   (a) receiving data including ad content and target data;
   (b) selecting one or more users of the plurality of users to receive an advertisement including the ad content based on the target data received in said step (a) and stored data associated with the one or more users;
   (c) displaying the ad content in a first area and calendar interface in a second area over displays for the one or more users selected in said step (b), the ad content displayed in the first area with a graphical object allowing information to be added to the calendar interface relating to the ad content;
   (d) receiving a selection of a graphical object on a display from a user of the one or more users via a user interface to add the information relating to the advertisement to a database of stored calendar events for the user; and
   (e) adding the information relating to the advertisement to the database of stored calendar events for the user upon receiving the selection of the graphical object in said step (d).

9. A computer-readable storage medium having computer-executable instructions for programming a processor to perform a method as recited in claim 8, wherein said step (e) comprises the step of storing the information relating to the advertisement on a database maintained within a service provider system supporting the calendar application program.

10. A computer-readable storage medium having computer-executable instructions for programming a processor to perform a method as recited in claim 8, wherein said step (e) comprises the step of storing the information relating to the advertisement on a database maintained within a computing device of the user.

11. A computer-readable storage medium having computer-executable instructions for programming a processor to perform a method as recited in claim 8, further comprising a step (f) of notifying a user with a reminder relating to the advertisement after the information relating to the advertisement has been added to the database of stored calendar events for the user in said step (e).

12. A computer-readable storage medium having computer-executable instructions for programming a processor to perform a method as recited in claim 8, wherein said step (a) of receiving data including ad content and target data comprises the step of receiving data within a service provider system supporting the calendar application program from an advertiser via a user interface and network connection between the advertiser and service provider system.

13. A computer-readable storage medium having computer-executable instructions for programming a processor to perform a method as recited in claim 8, wherein the information to be added to the calendar interface in said step (c) relates to an upcoming temporal event.

14. A computer-readable storage medium having computer-executable instructions for programming a processor to perform a method as recited in claim 8, wherein said step (b) of selecting the one or more users to receive the advertisement based on the target data and stored data associated with the one or more users comprises the steps of:
   (b1) searching one or more databases of stored user information for user;
   (b2) finding user information that correlates to the targeting data; and
   (b3) selecting a user to receive the advertisement where a correlation is found between the user information and targeting data.

15. A computer-readable storage medium having computer-executable instructions for programming a processor to perform a method as recited in claim 8, wherein said step (b) of selecting the one or more users to receive the advertisement based on the target data and stored data associated with the one or more users comprises the steps of selecting one or more users having stored address information indicating the user is within a defined geographical area or a defined geographical distance from an advertiser place of business.

16. A computer-readable storage medium having computer-executable instructions for programming a processor to perform a method as recited in claim 8, wherein said step (b) of selecting the one or more users to receive the advertisement based on the target data and stored data associated with the one or more users comprises the steps of selecting one or more users having stored information indicating the user is at least one of: i) a gender indicated by the target data, ii) within an age group indicated by the target data, iii) a religion indicated by the target data, iv) a nationality indicated by the target data, and v) an interest or preference indicated by the target data.

17. A computer-readable storage medium having computer-executable instructions for programming a processor to perform a method of targeted advertising in association with the use of a calendar application program by a plurality of users, comprising the steps of:
   (a) providing a calendar user interface, for use by one or more users, for display over one or more displays, the calendar user interface including a first area and a second area;
   (b) outputting at least a portion of one or more users' calendars in the first area;
   (c) receiving data including ad content, the ad content including a temporal event that may be placed on the calendar user interface;
   (d) displaying the ad content in the second area over one or more displays, wherein the ad content includes an actionable control for adding the corresponding temporal event to the calendar user interface;
   (e) receiving a selection of the actionable control by a user;
   (f) adding the ad content associated with the actionable control selected in said step (e) to the calendar user interface.

18. A computer-readable storage medium having computer-executable instructions for programming a processor to perform a method as recited in claim 17, wherein said steps (a) and (b) comprise the step of receiving data within a service provider system supporting the calendar application program from an advertiser via a user interface and network connection between the advertiser and service provider system.

19. A computer-readable storage medium having computer-executable instructions for programming a processor to perform a method as recited in claim 17, further comprising the steps of:
   (g) automatically receiving notification and new information relating to a change in the ad content from a computing device supported by the advertiser; and
   (h) automatically updating the ad content displayed on the shared calendar interface over the one or more.

* * * * *